June 3, 1924.
P. L. GRIFFIN
RIVETING DEVICE
Original Filed May 10, 1921
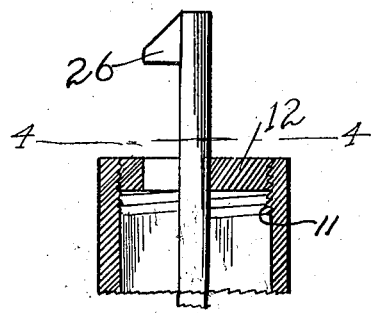
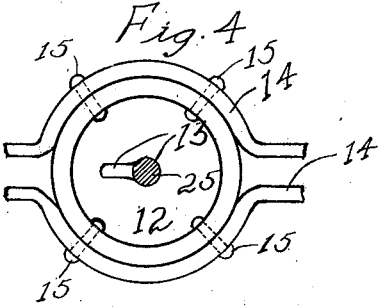
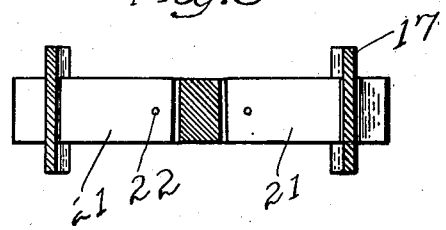
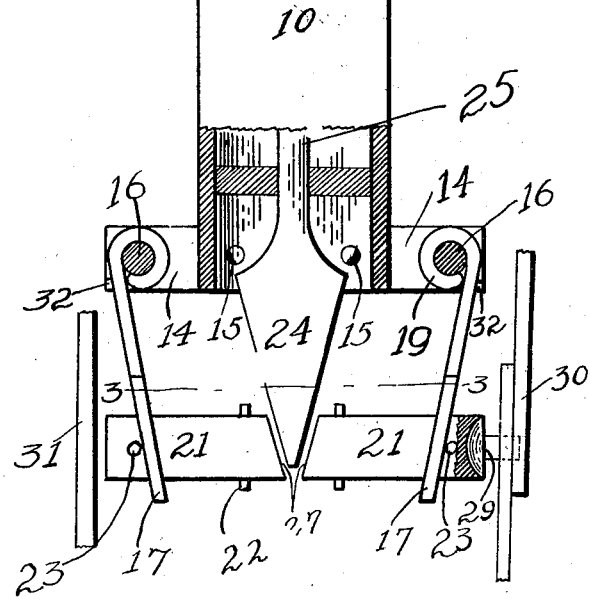
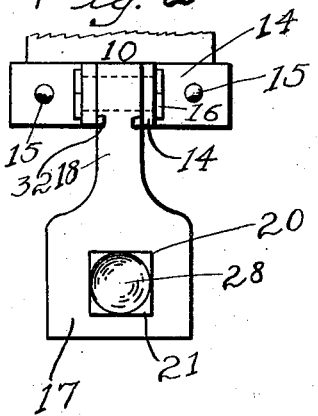
Witness
Hrd Latta
Inventor
Patrick L. Griffin
By Blair & Freeman
Attorneys Patented June 3, 1924.

1,496,052

UNITED STATES PATENT OFFICE.

PATRICK L. GRIFFIN, OF BOONE, IOWA.

RIVETING DEVICE.

Application filed May 10, 1921, Serial No. 468,284. Renewed April 7, 1924.

*To all whom it may concern:*

Be it known that I, PATRICK L. GRIFFIN, a citizen of the United States, and a resident of Boone, in the county of Boone and State of Iowa, have invented a certain new and useful Riveting Device, of which the following is a specification.

The object of my invention is to provide a device for engaging the head of a rivet, and for holding it in position while the opposite end of the rivet is being mashed, the parts being of simple, durable and comparatively inexpensive construction.

More particularly my invention relates to a device for engaging the head of a rivet in the type of work where it is very difficult to engage the rivet without some special tool for that purpose.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of my improved riveting device, parts being shown in section and broken away to better illustrate the construction.

Figure 2 is an end elevation of the lower end of my tool or device.

Figure 3 is a sectional view taken on the line 3—3 of Figure 1; and

Figure 4 is a horizontal sectional view taken on the line 4—4 of Figure 1.

In the accompanying drawings I have used the reference numeral 10 to indicate generally a hollow tube or pipe which has its upper end interiorly screw threaded as at 11.

A disk 12 having its periphery screw threaded is received within the pipe and on the screw threads 11. The disk 12 is provided with an opening 13 substantially T shaped for the purpose hereinafter more fully set forth. The shape of the opening 13 is clearly illustrated in Figure 4 of the drawings.

The lower end of the tube 10 has fixed to it a pair of arms 14 which have their ends project laterally from the tube 10. The arms 14 are fixed to the tube 10 by means of rivets 15. The ends of the arms 14 are provided with registering openings through which is extended the bolts 16.

It will be understood that the ends of the arms 14 are slightly spaced apart.

Swingingly mounted on the bolts 16 are the holder members 17. The holder members 17 are provided with a contracted portion 18 which has its upper end looped as at 19 for extending around the bolts 16.

The holder devices 17 are provided with the squared openings 20 in which are slidably received the blocks 21.

The blocks 21 are provided with pins 22 and 23 for preventing said blocks from becoming separated from the holder devices 17.

Received within the tube 10 is a wedge member 24 which is provided with a shank 25 and a head 26. The shank 25 is slidably received in the opening 13 of the disk 12.

The head 26 is designed to be slid through the T shaped opening when the wedge member is assembled.

After the head 26 has been slid through the opening the entire wedge member may be rotated through 180° so that the head 26 will no longer register with the T shaped opening.

The inner ends of the blocks 21 are provided with inclined surfaces 27 which are arranged substantially parallel to the sides of the wedge member 24.

One of the blocks 21 is provided with a cup shaped opening 28 which is designed to receive the head of a rivet 29 as shown in Figure 1 of the drawings. The reference numeral 30 refers to the boiler plates about to be riveted and 31 to a permanent or fixed plate.

When it is desired to hold the rivet in position the rivet 29 is first placed through an opening in the plates 30. My device is then inserted between the plates 30 and 31, and the cup shaped opening 28 is set over the rivet head.

The head 26 of the shank 25 is then tapped causing the wedge member 24 to engage the blocks 21 until they are forced apart so that one end rests against the plate 31 and the other block rests snugly against the head of the rivet.

When the device is inserted between the boiler plates 30 and 31 and the rivet is set it may then be riveted in position. The blocks 21 and the wedge member 24 form a continuous brace between the head of the rivet and the plate 31.

From the construction of the parts just described it will be seen that the riveting work which is ordinarily done in very close quarters may readily and easily be accomplished.

After the rivet has been set and riveted, and it is desired to remove the device, the underside of the head 26 may be tapped with a hammer thus permitting the wedge member 24 to move upwardly and the blocks 21 to be moved inwardly towards each other.

The arms 14 are provided with stops 32 for limiting the outward swinging movement of the holder devices 17.

The members 21 fit snugly enough in the openings 20. The members 21 are simply pushed out and the members 17 swing until the members 21 snugly engage the wall at one side and the ratchet head at the other side. There is very little downward pressure on the member 21, because as soon as the snug fit is secured, the downward pressure of the wedge 24 is stopped.

The advantages of my device are readily seen since I am able to hold rivets in places that are almost inaccessible.

Some changes may be made in the construction and arrangement of the parts of my riveting device without departing from the real spirit and purpose of my invention, and it is my intention to cover by my claims, any modified forms of structure or use of mechanical equivalents, which may be reasonably included within their scope.

I claim as my invention:

1. A rivet holding device, comprising a hollow member having a pair of oppositely projecting members at its lower end, a pair of holder devices pivotally secured to said members, blocks supported by said holder devices having their adjacent faces inclined, a shank slidably mounted in said hollow member, a wedge in one end thereof adapted to be received between said blocks for moving the blocks apart.

2. A rivet holding device comprising a hollow member having a pair of arms secured thereto at its lower end, holder devices swingingly mounted in said arms, blocks slidably mounted in said holder devices, means for preventing the separation of said blocks from said holder device, said blocks having their adjacent faces inclined, a wedge member extended through said hollow member and adapted to be received between said blocks and a shank on said wedge member whereby it may be driven for moving the block members apart, all for the purposes stated.

3. A rivet holding device comprising a hollow member having a pair of laterally extending arms on either side thereof at its lower end, said arms of each pair having their ends spaced apart, holder devices swingingly secured to said arms and received therebetween, blocks slidably mounted in said holder devices, said blocks having their inner adjacent ends inclined, one of said blocks having a cup shaped opening in one of its ends for receiving the head of a rivet, a wedge member received between the inner ends of said blocks, a shank on said wedge and extending through said hollow member, the parts being so arranged that the driving of said wedge member downwardly will cause the blocks to be moved apart all for the purposes stated.

4. A rivet holding device of the class described, including a hollow member, a wedge member extended through said hollow member, holder devices secured to the lower end of said hollow member and rivet members slidably mounted in said holder devices and adapted to engage said wedge member whereby movement of the wedge member will force said rivet members apart all for the purposes stated.

PATRICK L. GRIFFIN.